US012237493B2

(12) United States Patent
Xu et al.

(10) Patent No.: US 12,237,493 B2
(45) Date of Patent: Feb. 25, 2025

(54) LITHIATION DEVICE

(71) Applicant: CONTEMPORARY AMPEREX TECHNOLOGY (HONG KONG) LIMITED, Hong Kong (CN)

(72) Inventors: Yongqiang Xu, Ningde (CN); Xinlu Fei, Ningde (CN); Bin Xie, Ningde (CN); Shitong Chen, Ningde (CN); Keqiang Li, Ningde (CN); Tao Feng, Ningde (CN); Fenggang Zhao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 205 days.

(21) Appl. No.: 18/086,431

(22) Filed: Dec. 21, 2022

(65) Prior Publication Data

US 2023/0127246 A1 Apr. 27, 2023

Related U.S. Application Data

(63) Continuation of application No. PCT/CN2022/082840, filed on Mar. 24, 2022.

(30) Foreign Application Priority Data

Apr. 27, 2021 (CN) .......................... 202120890273.3

(51) Int. Cl.
*H01M 4/04* (2006.01)
*G01B 11/04* (2006.01)
*H01M 10/0587* (2010.01)

(52) U.S. Cl.
CPC ......... *H01M 4/0435* (2013.01); *G01B 11/043* (2013.01); *H01M 10/0587* (2013.01)

(58) Field of Classification Search
CPC .. H01M 4/0435; H01M 10/0587; H01M 4/04; H01M 4/0404; H01M 4/139;
(Continued)

(56) References Cited

U.S. PATENT DOCUMENTS

2023/0046202 A1* 2/2023 Terasawa ............ H01M 4/0435

FOREIGN PATENT DOCUMENTS

| CN | 206184976 U | 5/2017 |
| CN | 207038628 U | 2/2018 |

(Continued)

OTHER PUBLICATIONS

International Search Report and Written Opinion, PCT/CN2022/082840, May 31, 2022, 12 pgs.

(Continued)

*Primary Examiner* — S. Behrooz Ghorishi
(74) *Attorney, Agent, or Firm* — ANOVA LAW GROUP, PLLC

(57) ABSTRACT

This application discloses a lithiation device for applying a lithium film on an electrode plate. The lithiation device includes: a rolling mechanism including a first roller and a second roller, the two rollers configured to roll the electrode plate and the lithium film to apply the lithium film on the electrode plate; an adjustment mechanism connected to the rolling mechanism and configured to adjust a gap and/or a rolling force between the first roller and the second roller; a first monitoring mechanism configured to monitor a length of the electrode plate after the electrode plate passes through the rolling mechanism; and a controller configured to control the adjustment mechanism based on a comparison result of the length monitored by the first monitoring mechanism and a target length so that the length of the electrode plate after the electrode plate passes through the rolling mechanism approximates to the target length.

10 Claims, 2 Drawing Sheets

(58) Field of Classification Search
CPC ............ H01M 10/04; H01M 10/0409; H01M 10/0525; G01B 11/043; G01B 21/08; G01B 21/16; G01B 7/02; B30B 15/0041; B30B 3/04; B30B 15/0035; B30B 15/26; B30B 3/005; B32B 15/01; Y02E 60/10; Y02P 70/50

See application file for complete search history.

(56) References Cited

FOREIGN PATENT DOCUMENTS

| CN | 108630883 A | | 10/2018 |
| CN | 208127310 U | * | 11/2018 |
| CN | 109494342 A | | 3/2019 |
| CN | 209013952 U | | 6/2019 |
| CN | 214428674 U | | 10/2021 |
| JP | H10241678 A | | 9/1998 |
| JP | 2003297430 A | | 10/2003 |
| JP | 2011204612 A | | 10/2011 |
| JP | 2018142528 A | | 9/2018 |
| JP | 2018156915 A | | 10/2018 |
| JP | 2019212461 A | * | 12/2019 |
| KR | 20130139490 A | | 12/2013 |

OTHER PUBLICATIONS

Notice of Granting Priority Right of Utility Model Patent Right CN202120890273.3, Sep. 17, 2021, 1 pg.

The European Patent Office (EPO) The Extended European Search Report for 22783418.1 Sep. 29, 2023 6 Pages.

The Japan Patent Office (JPO) Notification of Reasons for Refusal for Application No. 2022-558148 Oct. 31, 2023 6 Pages(including translation).

Japan Patent Office (JPO) Decision to Grant a Patent For JP Application No. 2022-558148 Apr. 30, 2024 5 Pages (including translation).

* cited by examiner

LITHIATION DEVICE

CROSS-REFERENCE TO RELATED APPLICATIONS

This application is a continuation application of PCT Patent Application No. PCT/CN2022/082840, entitled "LITHIATION DEVICE" filed on Mar. 24, 2022, which claims priority to Chinese Patent Application No. 202120890273.3, filed with the State Intellectual Property Office of the People's Republic of China on Apr. 27, 2021, and entitled "LITHIATION DEVICE", all of which are incorporated herein by reference in their entirety.

TECHNICAL FIELD

This application relates to the field of battery manufacturing technologies, and in particular, to a lithiation device.

BACKGROUND

At present, lithium-ion batteries have been widely used in electric vehicles, consumer electronic products, and other fields due to their advantages such as high energy density and long service life. During first charging of a lithium-ion battery, part of lithium is consumed due to formation of a SEI film (that is, solid electrolyte interface film), which in turn causes loss of lithium in a positive electrode material, reduces battery capacity, and finally leads to a lower first-cycle efficiency. In order to alleviate irreversible reduction of battery capacity during the first charging, the industry generally uses a lithiation device to apply lithium on surfaces of electrode plates.

Generally, the lithiated electrode plates are subjected to winding for preparing a battery cell. However, during the winding, various tabs stacked together are prone to misalignment.

SUMMARY

Embodiments of this application disclose a lithiation device to avoid tab misalignment and increase yield of battery cells.

To solve the foregoing problems, the embodiments of this application adopt the following technical solutions:

Embodiments of this application provide a lithiation device for applying a lithium film on an electrode plate. The lithiation device includes:
- a rolling mechanism, including a first roller and a second roller, where the first roller and the second roller are configured to roll the electrode plate and the lithium film so as to apply the lithium film on the electrode plate;
- an adjustment mechanism, connected to the rolling mechanism and configured to adjust a gap and/or a rolling force between the first roller and the second roller;
- a first monitoring mechanism, configured to monitor a length of the electrode plate after the electrode plate passes through the rolling mechanism; and
- a controller, configured to control the adjustment mechanism based on a comparison result of the length monitored by the first monitoring mechanism and a target length so that the length of the electrode plate after the electrode plate passes through the rolling mechanism approximates to the target length.

In the lithiation device according to the embodiments of this application, the first monitoring mechanism can monitor a length of a lithiated electrode plate in real time, the controller can compare the length of the lithiated electrode plate with the target length and control, through feedback, the adjustment mechanism to adjust the gap and/or the rolling force between the first roller and the second roller, so that the length of the lithiated electrode plate gradually approximates to the target length. The first monitoring mechanism in the embodiments of this application monitors the length of the lithiated electrode plate, which has higher monitoring accuracy than thickness monitoring. Therefore, the length of the lithiated electrode plate can be accurately adjusted by using the adjustment mechanism to make the length of the lithiated electrode plate approximate to the target length, so that tab misalignment can be avoided during winding and stacking of the electrode plate, thereby increasing yield of battery cells.

In some embodiments, the electrode plate is provided with a plurality of spaced mark points along a length direction of the electrode plate, and the first monitoring mechanism is configured to monitor a distance between two adjacent ones of the mark points after the electrode plate passes through the rolling mechanism. In this way, the first monitoring mechanism can obtain a length of a single lithiated electrode plate unit by monitoring a spacing between two adjacent mark points.

In some embodiments, the rolling mechanism further includes a servo motor configured to drive the first roller and/or the second roller; and
the first monitoring mechanism includes:
- a monitoring unit, where the monitoring unit is arranged at downstream of the rolling mechanism in a feeding direction of the electrode plate, and the monitoring unit is configured to send a signal when the mark point is monitored; and
- a reading unit, configured to read a position difference monitored by an encoder of the servo motor during an interval of two signals to obtain a distance between two adjacent ones of the mark points.

In this way, by cooperation of the monitoring unit and the reading unit, a rotation stroke of the servo motor during an interval of two signals can be read accurately. A conveying distance of the electrode plate when being rolled is related to a rotation stroke of the rollers, and the rotation stroke of the rollers is related to the rotation stroke of the servo motor, so that the spacing between two mark points can be obtained. This monitoring method achieves both high monitoring accuracy and high monitoring efficiency.

In some embodiments, the monitoring unit is a through-beam photoelectric sensor, the through-beam photoelectric sensor includes a transmitting terminal and a receiving terminal, the transmitting terminal and the receiving terminal are respectively located on two sides of the electrode plate in a thickness direction, the mark points are through holes, and light emitted from the transmitting terminal passes through the through holes and is received by the receiving terminal. In this way, during conveying of the electrode plate, the through holes are aligned to the transmitting terminal and the receiving terminal, light emitted from the transmitting terminal can be transmitted to the receiving terminal through the through holes, thereby implementing monitoring of the mark points by the monitoring unit.

In some embodiments, the lithiation device further includes:

a second monitoring mechanism, where the second monitoring mechanism is arranged at upstream of the rolling mechanism in the feeding direction of the electrode plate and is configured to monitor a thickness of the electrode plate before the electrode plate passes through the rolling mechanism; and the controller is in communicative connection with the second monitoring mechanism, and the controller is configured to obtain the target length based on the thickness monitored by the second monitoring mechanism.

Due to consistent thickness of an incoming electrode plate before the electrode plate is rolled by the rolling mechanism, that is, due to a small fluctuation of thickness before the electrode plate passes through the rolling mechanism, the second monitoring mechanism can accurately monitor the thickness of the incoming electrode plate, and the controller can obtain the corresponding target length by matching.

In some embodiments, the second monitoring mechanism is configured to monitor a plurality of thicknesses of the electrode plate before the electrode plate passes through the rolling mechanism within a preset unit time, and the controller is configured to calculate an average thickness based on the plurality of thicknesses monitored by the second monitoring mechanism and obtain the target length based on the average thickness. In this way, monitoring error can be reduced and monitoring accuracy can be improved by calculating an average value through multiple times of monitoring, so that the target length can be obtained more accurately by matching.

In some embodiments, the adjustment mechanism includes a first adjustment assembly and a second adjustment assembly, the first adjustment assembly is configured to adjust a gap between the first roller and the second roller, the second adjustment assembly is configured to adjust a rolling force between the first roller and the second roller, and the controller is configured to control the first adjustment assembly and/or the second adjustment assembly based on the comparison result of the length monitored by the first monitoring mechanism and the target length. In this way, the adjustment mechanism can adjust both the gap and the rolling force between the first roller and the second roller.

In some embodiments, the rolling mechanism further includes a rack, a first adapter, and a second adapter, where the first adapter is movably disposed on the rack, the second adapter is fixedly disposed on the rack, the first roller is disposed on the first adapter, and the second roller is disposed on the second adapter; and the first adjustment assembly is configured to be able to drive the first adapter to move toward or away from the second adapter, so as to adjust the gap between the first roller and the second roller; and the second adjustment assembly is configured to apply a driving force to the first roller via the first adapter, so as to adjust the rolling force between the first roller and the second roller.

In this way, the first adjustment assembly can adjust the gap between the first roller and the second roller by adjusting a relationship between the first adapter and the second adapter; and the second adjustment assembly can adjust the rolling force between the first roller and the second roller by adjusting the relationship between the first adapter and the second adapter. Normal rotation of the first roller and the second roller is not interfered with in the adjustment process.

In some embodiments, the first adjustment assembly includes a first driving module, a first inclined block, a second inclined block, and a range sensor;

the first inclined block and the second inclined block are disposed between the first adapter and the second adapter, the first inclined block is fixedly connected to the first adapter, and the first inclined block and the second inclined block each are provided with an inclined surface that is in a slidable fit on an opposite side; and the range sensor is in communicative connection with the controller and configured to monitor a spacing between the first adapter and the second adapter, and the first driving module is connected to the second inclined block and configured to drive the second inclined block to move, so as to drive the first inclined block to slide along the inclined surface.

In this way, the range sensor can monitor the gap between the first roller and the second roller in real time, and the controller can implement closed-loop control, so that the electrode plate is rolled by the rolling mechanism to a length approximating to the target length.

In some embodiments, the second adjustment assembly includes a second driving module and a pressure sensor, the second driving module is mounted on the rack and connected to the first adapter, and the pressure sensor is in communicative connection with the controller and disposed between the second driving module and the first adapter. In this way, the pressure sensor is configured to monitor and return the rolling force between the first roller and the second roller, and the controller can implement closed-loop control, so that the electrode plate is rolled by the rolling mechanism to a length approximating to the target length.

BRIEF DESCRIPTION OF DRAWINGS

The accompanying drawings described herein are intended for better understanding of this application and constitute a part of this application. Exemplary embodiments and descriptions thereof in this application are intended to interpret this application and do not constitute any improper limitation on this application.

In the accompanying drawings.

Figure 1:
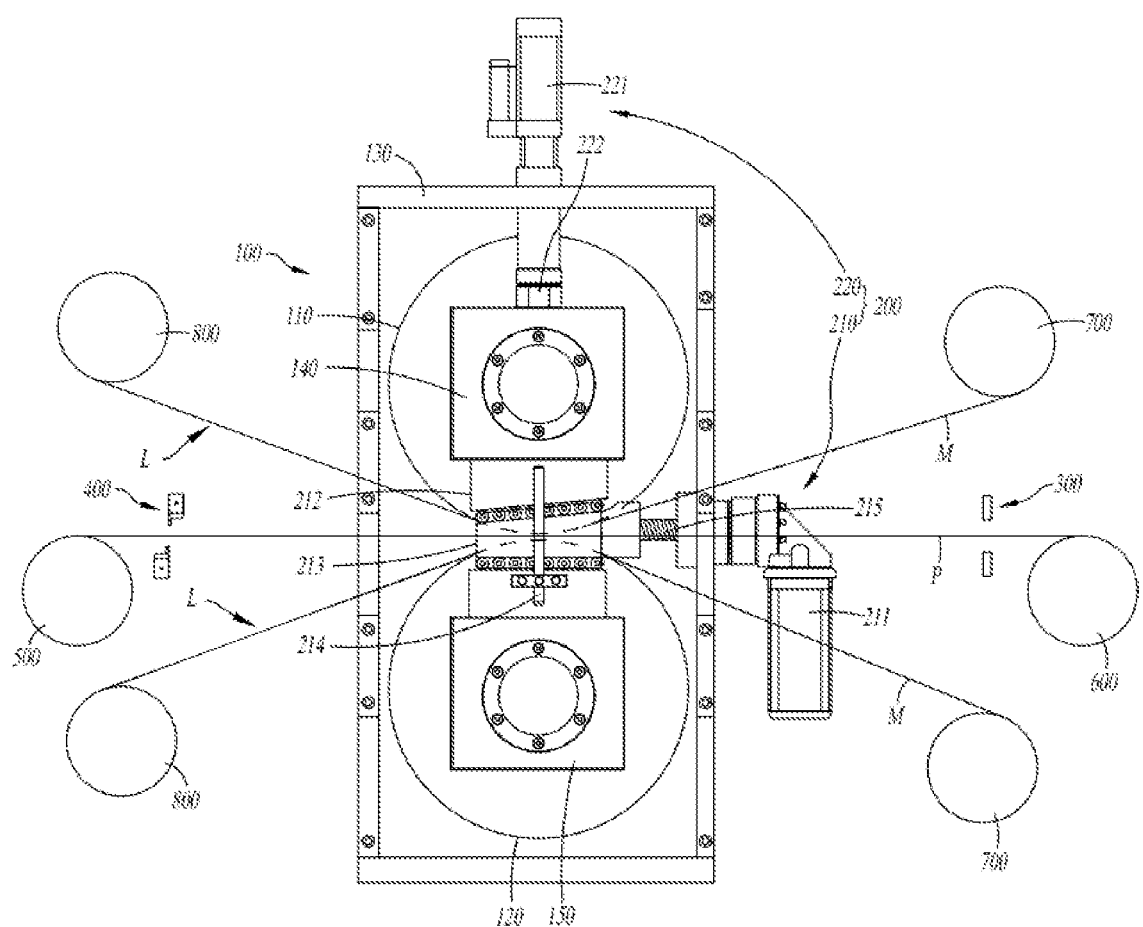
FIG. 1 is a schematic structural diagram of a lithiation device according to an embodiment of this application.

In the accompanying drawings, the figures are not drawn to scale.

Reference signs: 100. rolling mechanism; 110. first roller; 120. second roller; 130. rack; 140. first adapter; 150. second adapter; 200. adjustment mechanism; 210. first adjustment assembly; 211. first driving module; 212. first inclined block; 213. second inclined block; 214. range sensor; 215. lead screw; 220. second adjustment assembly; 221. second driving module; 222. pressure sensor; 300. first monitoring mechanism; 400. second monitoring mechanism; 500. electrode plate unwinding roll; 600. electrode plate winding roll; 700. substrate winding roll; 800. substrate unwinding roll; L. lithium film; M. substrate; P. electrode plate; and P1. mark point.

DESCRIPTION OF EMBODIMENTS

To make objectives, technical solutions, and advantages of embodiments of this application clearer, the following clearly and completely describes the technical solutions of the embodiments of this application with reference to the specific embodiments of this application and the corresponding accompanying drawings. Apparently, the described embodiments are merely some but not all of the embodiments of this application. All other embodiments obtained by a person of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application belongs. The terms used in the specification of this application are merely intended to describe the specific embodiments but not intended to constitute any limitation on this application. The terms "include", "comprise", and any variations thereof in the specification and claims of this application and the foregoing description of the drawings are intended to cover non-exclusive inclusions. In the specification, claims, or accompanying drawings of this application, the terms "first", "second", and the like are intended to distinguish between different objects but do not indicate a particular order or a subordinate relationship.

An "embodiment" mentioned in this application means that specified features, structures, or characteristics described with reference to this embodiment may be included in at least one embodiment of this application. The word "embodiment" in various positions in the specification does not necessarily refer to a same embodiment, or an independent or alternative embodiment that is exclusive of other embodiments. A person skilled in the art can clearly and implicitly understand that the embodiments described in this application can be combined with another embodiment.

In the descriptions of this application, it should be noted that unless otherwise specified and defined explicitly, the terms "installment", "link", "connection", and "attachment" should be understood in their general senses. For example, the terms may be a fixed connection, a detachable connection, or an integrated connection, or may be a direct connection, an indirect connection through an intermediate medium, or an internal connection between two elements. A person of ordinary skill in the art can understand specific meanings of these terms in this application based on specific situations.

The term "and/or" in this application describes only an association relationship for describing associated objects and represents that three relationships may exist. For example, A and/or B may represent the following three cases: A alone, both A and B, and B alone. In addition, the character "/" in this application generally indicates an "or" relationship between the associated objects.

In this application, "a plurality of" means more than two (inclusive). Similarly, "a plurality of groups" means more than two (inclusive) groups, and "a plurality of pieces" means more than two (inclusive) pieces.

The battery mentioned in this application is a single physical module that includes one or more battery cells for providing a higher voltage and capacity. For example, the battery mentioned in this application may include a battery module, a battery pack, or the like.

An electrode assembly in the battery cell is a core component of a lithium-ion battery that can achieve a function of repeated charging and discharging. The electrode assembly includes a positive electrode plate, a negative electrode plate, and a separator. Working of the lithium-ion battery mainly relies on migration of lithium ions between the positive electrode plate and the negative electrode plate.

The positive electrode plate includes a positive electrode current collector and a positive electrode active substance layer applied on a surface of the positive electrode current collector. A current collector uncoated with the positive electrode active substance layer bulges out of a current collector coated with the positive electrode active substance layer, and the current collector uncoated with the positive electrode active substance layer is used as a positive tab. Generally, in the lithium-ion battery, the positive electrode current collector may be aluminum foil, and the positive electrode active substance layer may be ternary lithium, lithium manganate, lithium cobaltate, lithium iron phosphate, or the like.

The negative electrode plate includes a negative electrode current collector and a negative electrode active substance layer applied on a surface of the negative electrode current collector. A current collector uncoated with the negative electrode active substance layer bulges out of a current collector coated with the negative electrode active substance layer, and the current collector uncoated with the negative electrode active substance layer is used as a negative tab. Generally, in the lithium-ion battery, the negative electrode current collector may be copper foil, and the negative electrode active substance layer may be carbon, silicon, or the like.

A solid electrolyte interface film is formed in the first charging and discharging process, and the solid electrolyte interface film consumes a part of lithium, causing loss of lithium, which leads to capacity loss of the lithium-ion battery. To compensate for loss of active lithium in the first charging and discharging process of the lithium-ion battery, it is necessary to perform lithiation of active lithium on an active substance layer of an electrode plate in advance during formation of the electrode plate. At present, irreversible reduction of capacity of the lithium-ion battery during first charging is generally alleviated by applying lithium on a surface of the electrode plate by a lithiation device, thereby improving capacity and prolonging cycle life of the lithium-ion battery.

A lithiation process of the electrode plate mainly includes a calendering process and a laminating process. The calendering process is to thin a lithium belt to form a lithium film by rolling, and the laminating process is to laminate the lithium film to a surface of the electrode plate by rolling. Specifically, lithium attached on the electrode plate is required to reach a thickness of micrometers in a manufacturing process of the electrode plate, and accordingly a millimeter-scale lithium belt needs to be calendered to a micron-scale lithium film through the calendering process. However, due to its own strength, the micron-scale lithium film cannot be formed into a belt independently, that is, the lithium belt will be broken during a thinning process. Therefore, when the lithium belt is calendered, a thinned lithium film is required to be attached onto a substrate, and the substrate is used as a carrier to ensure that the lithium film can be formed into a belt. The substrate attached with the lithium film can be called a lithium-attached substrate.

In the laminating process, the electrode plate and the lithium-attached substrate are simultaneously conveyed to the rolling mechanism of the lithiation device. Since a bonding force between the lithium film and the substrate is less than a bonding force between the lithium film and the electrode plate, after being subjected to rolling, the lithium film is attached to the surface of the electrode plate. Along with feeding of the electrode plate, the electrode plate has a pulling effect on the lithium film and make the lithium film peel off from the surface of the substrate, so that the laminating process of the lithium film on the surface of the electrode plate is realized.

After the electrode plate is subjected to lithiation by the lithiation device in the prior art, the lithiated electrode plate often has a problem of tab misalignment in the subsequent winding and stacking process, and tab misalignment will seriously affect working performance of the battery cell. It should be noted that tabs are a carrier for energy transmission between the battery cell and the outside, and alignment of the tabs needs to be ensured during formation of the electrode plate. In view of the foregoing problems, the inventor monitored the thickness of the lithiated electrode plate and controlled the rolling mechanism to adjust the thickness of the lithiated electrode plate, so as to ensure thickness consistency of the lithiated electrode plate to alleviate the problem of tab misalignment.

However, even if the foregoing measures are taken, the lithiated electrode plate still has the problem of tab misalignment during winding and stacking. After further research, the inventor has found that the foregoing problems are caused by low thickness monitoring accuracy due to a large thickness fluctuation of the lithiated electrode plate. Specifically, in the lithiation process, after the electrode plate and the lithium-attached substrate are subjected to rolling, the electrode plate is pressed and extend unevenly, and there is definitely uncertainty in change of thickness, which in turn causes a large thickness fluctuation. Moreover, tiny stripes are formed on the surface of the lithiated electrode plate due to rolling, and these stripes further increase the thickness fluctuation of the electrode plate. Therefore, in the case of an obviously large thickness fluctuation of the lithiated electrode plate, thickness monitoring on the lithiated electrode plate will inevitably have a problem of low monitoring accuracy. As a result, a great error will be caused in adjusting the size of the lithiated electrode plate by using the rolling mechanism, and the problem of tab misalignment persists.

Based on this, embodiments of this application provide a lithiation device, in which a first monitoring mechanism is provided to monitor a length of a lithiated electrode plate, the length of the lithiated electrode plate is compared with a target length, an adjustment mechanism is controlled based on feedback of a comparison result to adjust a relationship between a first roller and a second roller, so that the length of the lithiated electrode plate approximates to the target length. Because the lithiation device according to the embodiments of this application directly monitors the length of the lithiated electrode plate, the monitoring of length will not have large fluctuation like the monitoring of width, so that the length of the lithiated electrode plate can be accurately monitored. The length of the lithiated electrode plate is accurately adjusted by using the rolling mechanism, thereby avoiding the problem of tab misalignment.

FIG. 1 is a schematic structural diagram of a lithiation device according to an embodiment of this application. The lithiation device is configured to apply a lithium film L on an electrode plate P, including a rolling mechanism 100, an adjustment mechanism 200, a first monitoring mechanism 300, and a controller (not shown in figure).

The rolling mechanism 100 is configured to implement a laminating process. Specifically, the rolling mechanism 100 includes a first roller 110 and a second roller 120, and the first roller 110 and the second roller 120 are configured to roll the electrode plate P and the lithium film L so as to apply the lithium film L on the electrode plate P.

Generally, the lithiation device further includes an electrode plate conveying mechanism and a lithium film conveying mechanism. The electrode plate conveying mechanism is configured to send the electrode plate P to between the first roller 110 and the second roller 120. The lithium film conveying mechanism is configured to send the lithium-attached substrate to between the first roller 110 and the second roller 120, so that the electrode plate P and the lithium-attached substrate can be subjected to rolling by the first roller 110 and the second roller 120, thereby realizing lamination of the lithium film L and the electrode plate P during rolling.

Figure 2:
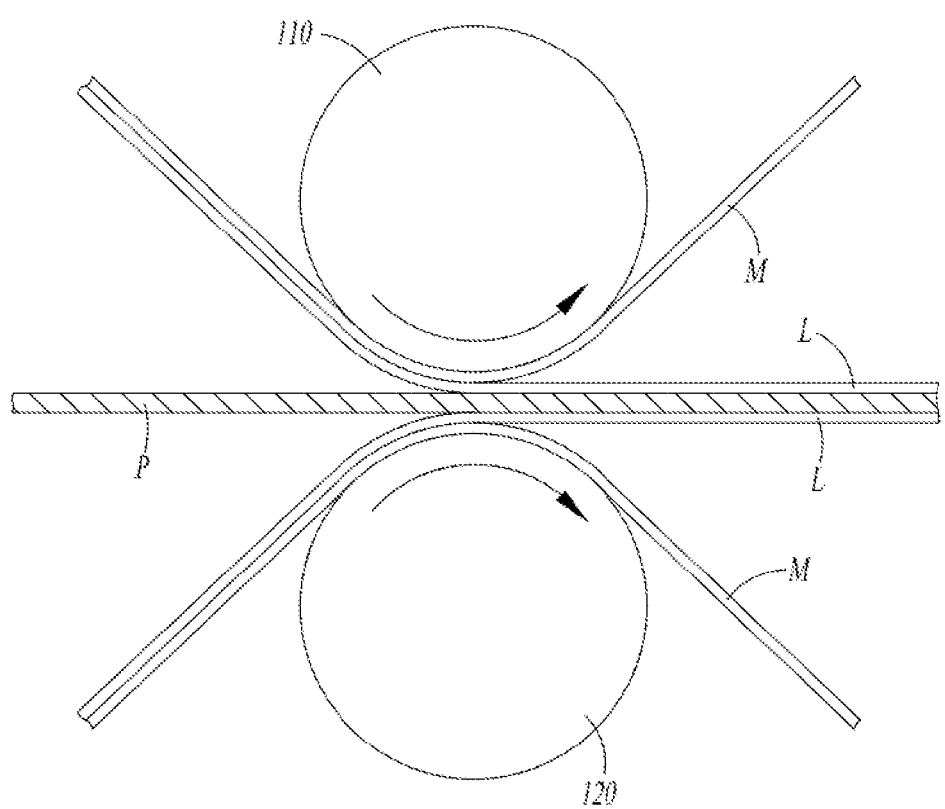
FIG. 2 is a schematic diagram of a working principle of a rolling mechanism in FIG. 1.

FIG. 2 is a schematic diagram of a working principle of the rolling mechanism 100 in FIG. 1. As shown in FIG. 2, in order to smoothly attach the lithium film L of the lithium-attached substrate onto a surface of the electrode plate P, a surface roughness of the electrode plate P is generally greater than a surface roughness of a substrate M, so that a bonding force between the lithium film L and the substrate M is less than a bonding force between the lithium film L and the electrode plate P. The lithium film L is attached onto the surface of the electrode plate P after being subjected to rolling, and along with feeding of the electrode plate P, the electrode plate P has a pulling effect on the lithium film L and makes the lithium film L peel off from the surface of the substrate M, so that the lithium film L is laminated on the surface of the electrode plate P. Certainly, in other embodiments, the bonding force between the lithium film L and the substrate M may be made less than the bonding force between the lithium film L and the electrode plate P by adjusting parameters such as a feeding speed of the electrode plate P and the lithium-attached substrate or a rolling force of the first roller 110 and the second roller 120.

As shown in FIG. 1, the electrode plate conveying mechanism may generally include an electrode plate unwinding roll 500 and an electrode plate winding roll 600. The electrode plate unwinding roll 500 and the electrode plate winding roll 600 are configured for arranging the electrode plate P. The electrode plate P may be arranged on the electrode plate unwinding roll 500 and the electrode plate winding roll 600 by winding. In order to match a conveying direction of the electrode plate P, along a feeding direction of the electrode plate P, the electrode plate unwinding roll 500 is arranged at upstream of the rolling mechanism 100, and the electrode plate winding roll 600 is arranged at downstream of the rolling mechanism 100.

It should be noted that, during feeding, the electrode plate P is unwound by the electrode plate unwinding roll 500, passes through the rolling mechanism 100 and is conveyed to the electrode plate winding roll 600; the electrode plate unwinding roll 500, the rolling mechanism 100, and the electrode plate winding roll 600 are all located on the feeding direction of the electrode plate P; the upstream and the downstream are sequential order in processing. For example, the electrode plate unwinding roll 500 being arranged at upstream of the rolling mechanism 100 and the electrode plate winding roll 600 being arranged at downstream of the rolling mechanism 100 means that, in a processing sequence, the electrode plate P is unwound by the electrode plate unwinding roll 500 first, is subjected to rolling by the rolling mechanism 100, and then is wound by the electrode plate winding roll 600.

Along the feeding direction of the electrode plate P, the lithium film conveying mechanism may include a substrate winding roll 700 arranged at downstream of the rolling mechanism 100. The substrate M is connected to the substrate winding roll 700 by winding. The substrate winding roll 700 has a pulling effect on the entire lithium-attached substrate while winding the substrate M, so that the lithium-attached substrate is conveyed successfully. Certainly, along the feeding direction of the electrode plate P, the lithium film conveying mechanism may further include a substrate unwinding roll 800 at upstream of the rolling mechanism 100. The substrate winding roll 700 and the substrate unwinding roll 800 together serve as a base for arranging the lithium-attached substrate. An arranging position of the lithium-attached substrate may be adjusted based on the positions of the substrate winding roll 700 and the substrate unwinding roll 800, thereby avoiding interference between the lithium-attached substrate and the electrode plate P during conveying.

The adjustment mechanism 200 is configured to adjust the length of the lithiated electrode plate P so that the length of the lithiated electrode plate P approximates to the target length. Specifically, the adjustment mechanism 200 is connected to the rolling mechanism 100 and configured to adjust a gap and/or a rolling force between the first roller 110 and the second roller 120.

It should be understood that in this embodiment of this application, the adjustment mechanism 200 may have a function of adjusting only the gap or the rolling force between the first roller 110 and the second roller 120, or may have a function of adjusting both the gap and the rolling force between the first roller and the second roller 120.

The adjustment mechanism 200 adjusts the gap between the first roller 110 and the second roller 120, so that size of a space for the electrode plate P and the lithium film L to pass through between the first roller 110 and the second roller 120 can be changed. When the gap is decreased, the electrode plate P applied with lithium is thinner, so that the length of the lithiated electrode plate P is increased. When the gap is increased, the electrode plate P applied with lithium is thicker, so that the length of the lithiated electrode plate P is reduced.

The adjustment mechanism 200 adjusts the rolling force between the first roller 110 and the second roller 120, so that the rolling effect on the electrode plate P and the lithium film L can be changed. When the rolling force is decreased, the rolling action on the electrode plate P and the lithium film L is weakened, the electrode plate P applied with lithium is thicker, and the length of the lithiated electrode plate P is reduced. When the rolling force is increased, the rolling action on the electrode plate P and the lithium film L is enhanced, the electrode plate P applied with lithium is thinner, and the length of the lithiated electrode plate P is increased.

As described above, the adjustment mechanism 200 in this embodiment of this application may also have the function of adjusting the bonding force between the lithium film L and the substrate M and the bonding force between the lithium film L and the electrode plate P.

The first monitoring mechanism 300 is configured to monitor a length of the electrode plate P after the electrode plate P passes through the rolling mechanism 100, that is, configured to monitor the length of the lithiated electrode plate P.

The controller is configured to implement closed-loop control on various components of the lithiation device. Specifically, the controller is in communicative connection with the first monitoring mechanism 300 and the adjustment mechanism 200 separately, so that communicative interaction between the first monitoring mechanism 300 and the adjustment mechanism 200 can be realized.

Moreover, the controller is configured to control the adjustment mechanism 200 based on a comparison result of the length monitored by the first monitoring mechanism 300 and a target length so that the length of the electrode plate P after the electrode plate P passes through the rolling mechanism 100 approximates to the target length. In a specific working process, the first monitoring mechanism 300 feeds back the monitored length of the lithiated electrode plate P to the controller, and the controller can compare the length monitored by the first monitoring mechanism 300 with the target length. If the length monitored by the first monitoring mechanism 300 is greater than the target length, the controller controls the adjustment mechanism 200 to reduce the length of the lithiated electrode plate P; and if the length monitored by the first monitoring mechanism 300 is less than the target length, the controller controls the adjustment mechanism 200 to increase the length of the lithiated electrode plate P.

The first monitoring mechanism 300 monitors the length of the lithiated electrode plate P in real time, and the controller continuously compares the length monitored by the first monitoring mechanism 300 with the target length and controls the adjustment mechanism 200, thereby implementing closed-loop control on various components in the lithiation device. In the foregoing adjustment process, the adjustment mechanism 200 can modify rolling parameters for an electrode plate unit based on a length of a previous lithiated electrode plate unit, so as to ensure that in the adjustment process of continuously modifying the incoming electrode plate P by the adjustment mechanism 200, the length of the lithiated electrode plate gradually approximates to the target length.

It should be noted that the electrode plate P is generally cut by a winding machine to form an independent electrode plate unit. Before cutting, the electrode plate P has a relatively long length, and the length monitored by the first monitoring mechanism 300 is a length of a part formed into an electrode plate unit, and the target length is an empirical length or a length capable of achieving good performance, of the part formed into an electrode plate unit. For ease of subsequent description, in the embodiments of this application, parameter monitoring of the electrode plate P is performed based on electrode plate units.

In this embodiment of this application, the first monitoring mechanism 300 monitors the length of the lithiated electrode plate P. Since the length of the electrode plate P is greater than its thickness, and the change in length of the electrode plate P is more distinct than the change in thickness, the difficulty in monitoring the length of the lithiated electrode plate P is lower, and the monitoring accuracy is inevitably higher, thereby avoiding serious error in monitoring. In a case that data obtained by the first monitoring mechanism 300 is more accurate, the controller can accurately compare the data with the target length based on the data, and then send a more accurate adjustment instruction to the adjustment mechanism 200.

Moreover, under the control of the controller, the adjustment mechanism 200 adjusts the subsequent incoming electrode plate P so that the length of the lithiated electrode plate approximates to the target length. Because the target length is usually the same, the length of each part of the lithiated electrode plate P that is formed into an electrode plate unit through the lithiation device is also approximately equal, without obvious difference in length extension, thereby ensuring tab alignment in the subsequent winding and stacking process of the electrode plate P and avoiding tab misalignment.

It should be noted that, because the size of each electrode plate unit is approximately the same, under the condition that the length of each part formed into the electrode plate unit approximates to the target length, its thickness is less likely to cause the problem of tab misalignment. The embodiments of this application do not limit the specific type of the controller. For example, the controller may be a PLC (that is, Programmable Logic Controller, programmable logic controller), an industrial computer, or the like.

It can be seen from the foregoing description that, in the lithiation device according to the embodiment of this application, the first monitoring mechanism 300 can monitor the length of the lithiated electrode plate P in real time, and the controller can compare the length of the lithiated electrode plate P with the target length and control, through feedback, the adjustment mechanism 200 to adjust the gap and/or the rolling force between the first roller 110 and the second roller 120, so that the length of the lithiated electrode plate P gradually approximates to the target length. The first monitoring mechanism 300 in this embodiment of this application monitors the length of the lithiated electrode plate P, which has higher monitoring accuracy than thickness monitoring. Therefore, the length of the lithiated electrode plate P can be accurately adjusted by using the adjustment mechanism 200 to make the length of the lithiated electrode plate P approximate to the target length, so that tab misalignment can be avoided during winding and stacking of the electrode plate P, thereby increasing yield of battery cells.

In the lithiation process of the electrode plate P, lithium needs to be applied on both sides of the electrode plate P to ensure performance quality of the electrode plate P when in use. Generally, as shown in FIG. 1 and FIG. 2, the lithiation device according to the embodiment of this application has a function of applying lithium on both surfaces. In this case, the lithiation device may include two lithium film conveying mechanisms. The two lithium film conveying mechanisms respectively convey lithium-attached substrates corresponding to the two surfaces of the electrode plate P. After the two sets of lithium-attached substrates and electrode plate P pass through the rolling mechanism 100, the lithium film L is applied on both surfaces of the electrode plate P.

Certainly, the embodiments of this application do not limit the specific lithiation method for the electrode plate P of the lithiation device, and the lithiation device may have a function of applying lithium only on one side. In this case, the lithiation device includes only one lithium film conveying mechanism. The lithium film conveying mechanism conveys the lithium-attached substrate on one surface of the electrode plate P. After the lithium-attached substrate and the electrode plate P pass through the rolling mechanism 100, the lithium film L is applied on only one surface of the electrode plate P. In this implementation, in order to implement double-sided lithium coating for the electrode plate P coated with lithium on one side, the electrode plate P can be conveyed into the rolling mechanism 100 again for secondary lithiation, with the side that is not coated with lithium facing toward the lithium film conveying mechanism. Alternatively, a production line of the electrode plate P includes two lithiation devices according to the embodiment of this application, and the two lithiation devices respectively apply lithium to two sides of the electrode plate P.

The embodiments of this application do not limit the specific method of monitoring the length of the lithiated electrode plate P. For example, the first monitoring mechanism 300 can measure the width of a tab and the spacing between the tabs, the sum of which is the length of the electrode plate P. However, this monitoring method is complex with a low monitoring efficiency.

Figure 3:
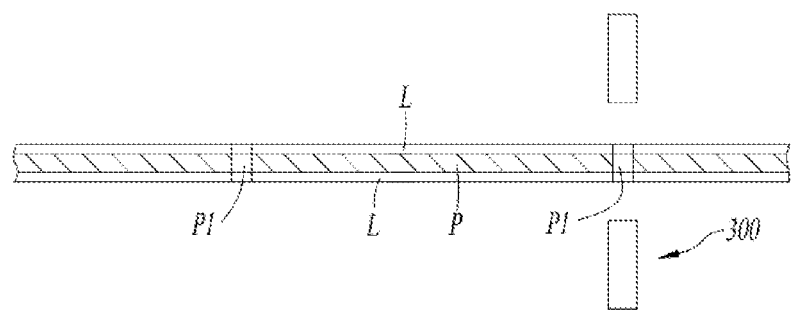
FIG. 3 is a schematic diagram of working principle of a first monitoring mechanism according to an embodiment of this application.

FIG. 3 is a schematic diagram of a working principle of a first monitoring mechanism 300 according to an embodiment of this application. To facilitate length measurement of the lithiated electrode plate P, in this embodiment of this application, as shown in FIG. 3, the electrode plate P is provided with a plurality of spaced mark points P1 in a length direction of the electrode plate P, and the first monitoring mechanism 300 may be configured to monitor a distance between two adjacent mark points P1 after the electrode plate P passes through the rolling mechanism 100. It should be understood that, in this embodiment, two adjacent mark points P1 are used for marking a length region of a single electrode plate unit preset on the electrode plate P, and in the subsequent process, the electrode plate unit can be obtained by cutting the electrode plate P along the mark points P1. In this way, a spacing between two adjacent mark points P1 represents the length of the single electrode plate unit. Taking the mark point P1 as a reference, the first monitoring mechanism 300 can easily monitor the length of the lithiated electrode plate P.

In the embodiments of this application, there are various ways for the first monitoring mechanism 300 to monitor the length of the lithiated electrode plate P, that is, the embodiments of this application do not limit the specific type of the first monitoring mechanism 300. For example, the first monitoring mechanism 300 may be a CCD camera (that is, charge coupled device camera, which is an image sensor camera). The CCD camera may capture an image of the lithiated electrode plate P, and a camera system may calculate a distance between two adjacent mark points P1 in a to-be-monitored area and generate length data of the lithiated electrode plate P.

In another specific implementation, the rolling mechanism 100 in this embodiment of this application may further include a servo motor for driving a first roller 110 and/or a second roller 120. The first monitoring mechanism 300 includes a monitoring unit and a reading unit (not shown in the figure). The monitoring unit is arranged at downstream of the rolling mechanism 100 in a feeding direction of the electrode plate P, and the monitoring unit is configured to send a signal when the mark point P1 is monitored; and the reading unit configured to read a position difference monitored by an encoder of the servo motor during an interval of two signals to obtain a distance between two adjacent mark points P1.

It should be noted that the embodiments of this application do not limit the quantity of servo motors, and the servo motor may be provided in the quantity of one. This servo motor is configured to drive the first roller 110 or the second roller 120, the servo motor is used with the reading unit to represent the distance between two adjacent mark points P1, and the roller not driven by the servo motor can be driven by other driving structures. There May alternatively be two servo motors, the two servo motors drive the first roller 110 and the second roller 120 respectively, and the reading unit can read data of an encoder of one of the servo motors to represent the distance between two adjacent mark points P1.

Specifically, because the electrode plate P is fed by passing through the rolling mechanism 100, a conveying speed of the electrode plate P and a linear speed of the edge of the roller are the same. During the interval between two signals monitored by the monitoring unit, a rotation stroke of the roller (the first roller 110 and/or the second roller 120) is the distance between two adjacent mark points P1. Because the roller is driven by the servo motor, the rotation stroke of the roller is related to a rotation stroke of the servo motor. Based on the rotation stroke of the servo motor and a transmission ratio relationship between the servo motor and the roller, the rotation stroke of the roller can be obtained.

Moreover, the encoder of the servo motor can monitor an angular displacement of the servo motor when the servo motor rotates, and the rotation stroke of the servo motor can be obtained by calculating the position difference during the interval between two signals. Based on the foregoing description, the rotation of the roller can be obtained, and then the distance between two adjacent mark points P1 can be obtained.

In the foregoing implementation, calculation is performed based on the angular displacement data of the rotating servo motor monitored by the encoder, the obtained distance between the two adjacent mark points P1 is more accurate, which improves the monitoring accuracy and monitoring efficiency of the first monitoring mechanism 300.

In the embodiments of this application, various types of monitoring units may be used. For example, the monitoring unit may be a proximity switch, and the mark point P1 on the electrode plate P is a trigger structure. When the monitoring unit is close to the mark point P1, the monitoring unit responds with a signal. The proximity switch may be a capacitive proximity switch, an electromagnetic proximity switch, an infrared inductive proximity switch, or the like.

As shown in FIG. 1 and FIG. 3, in another specific implementation, the monitoring unit in this embodiment of this application may be a through-beam photoelectric sensor. The through-beam photoelectric sensor includes a transmitting terminal and a receiving terminal, the transmitting terminal and the receiving terminal are respectively located on two sides of the electrode plate in a thickness direction of the electrode plate P, the mark points P1 are through holes, and light emitted from the transmitting terminal passes through the through holes and is received by the receiving terminal.

It should be understood that the transmitting terminal can emit light, and the light is projected to the receiving terminal. Certainly, the receiving terminal needs to be arranged on a propagation path of light emitted by the transmitting terminal so that the light can be received and a signal can be monitored by a monitoring circuit in the through-beam photoelectric sensor. Generally, being blocked by the electrode plate P, light is hardly projected to the receiving terminal, and the monitoring circuit can hardly monitor a signal. Such state lasts until the electrode plate P is conveyed to a position at which the mark point P1 is aligned with the transmitting terminal and the receiving terminal. Because the mark point P1 is a through hole, light can pass through the through hole and is projected to the receiving terminal. At two adjacent mark points P1, the monitoring circuit is connected twice, so that two signals can be monitored.

It should be noted that, in the implementation in which the mark point P1 is a through hole, the lithium film L does not block the light at the through hole. Specifically, if the through hole is formed on a tab, the lithium film L is not applied on the tab, and therefore does not affect the propagation of light. If the through hole is formed in a main body part of the electrode plate P, when the lithium film L and the electrode plate P are subjected to rolling again for applying lithium, because the mark point P1 is a through hole, an area in which the through hole is formed cannot be attached to the lithium film L, the lithium film L at the corresponding through hole is still attached to the substrate M. Due to a bonding effect between the substrate M and this part of lithium film L, the through hole on the lithiated electrode plate P is still exposed, and propagation of light is not affected.

In the embodiments of this application, there are various ways to determine the target length of the lithiated electrode plate P. For example, an empirical value of the target length may be directly input to the controller. However, the empirical target length is obtained not based on the actual incoming electrode plate P, deviations are likely to be introduced in adjusting the length of the lithiated electrode plate P, which affects the performance quality of the electrode plate P.

Based on this, the lithiation device according to the embodiment of this application may further include a second monitoring mechanism 400. The second monitoring mechanism 400 is arranged at upstream of the rolling mechanism 100 in the feeding direction of the electrode plate P and is configured to monitor a thickness of the electrode plate P before the electrode plate P passes through the rolling mechanism 100. The controller is in communicative connection with the second monitoring mechanism 400, and the controller is configured to obtain the target length based on the thickness monitored by the second monitoring mechanism 400.

Specifically, the second monitoring mechanism 400 can monitor the thickness of the electrode plate P before lithiation, and the second monitoring mechanism 400 can communicate and interact with the controller, and can feed back the monitored thickness to the controller, and the controller can calculate the target length by matching based on an internal algorithm.

Free from the rolling action of the rolling mechanism 100, the incoming electrode plate P has good thickness consistency, that is, the incoming electrode plate P has a small thickness fluctuation. In this case, the monitoring accuracy of the second monitoring mechanism 400 is high, and the target length matching the thickness monitored by the second monitoring mechanism 400 is more accurate. Moreover, the target length in this embodiment is obtained based on actual size parameters of the incoming electrode plate P, so that no deviations are caused in the length adjustment after the electrode plate is lithiated, thereby ensuring the performance quality of the electrode plate P.

The embodiments of this application do not limit a specific type of the second monitoring mechanism 400, which may be a laser thickness sensor, an ultrasonic thickness sensor, a magnetic thickness sensor, or the like.

Further, the second monitoring mechanism 400 may be configured to monitor a plurality of thicknesses of the electrode plate P before the electrode plate P passes through the rolling mechanism 100 within a preset unit time, and the controller is configured to calculate an average thickness based on the plurality of thicknesses monitored by the second monitoring mechanism 400 and obtain the target length based on the average thickness. It should be understood that the second monitoring mechanism 400 can monitor thicknesses of a plurality of electrode plate units before lithiation within a preset unit time, and that the controller calculates an average thickness based on thickness data of the plurality of electrode plate units before lithiation; the second monitoring mechanism 400 always has a slight error during monitoring, but in this implementation, the monitoring error is reduced by calculating an average value through multiple times of monitoring, so that the monitoring accuracy can be improved, and the target length can be obtained more accurately by matching.

The embodiments of this application do not limit a specific value of the preset unit time, which may be 1 s, 10 s, or the like.

As shown in FIG. 1, in order to make the adjustment mechanism 200 have the function of adjusting both the gap and the rolling force between the first roller 110 and the second roller 120, the adjustment mechanism 200 in this embodiment of this application may include a first adjustment assembly 210 and a second adjustment assembly 220, the first adjustment assembly 210 is configured to adjust the gap between the first roller 110 and the second roller 120, the second adjustment assembly 220 is configured to adjust the rolling force between the first roller 110 and the second roller 120, and the controller is configured to control the first adjustment assembly 210 and/or the second adjustment assembly 220 based on the comparison result of the length monitored by the first monitoring mechanism 300 and the target length.

It should be understood that, based on the adjustment mechanism 200 in this embodiment of this application, the gap or the rolling force between the first roller 110 and the second roller 120 can be selectively adjusted. Certainly, the first adjustment assembly 210 and the second adjustment assembly 220 may alternatively be controlled simultaneously to adjust both the gap and the rolling force between the first roller 110 and the second roller 120.

Generally, as shown in FIG. 1, the rolling mechanism 100 may further include a rack 130, a first adapter 140, and a second adapter 150, where the first adapter 140 is movably disposed on the rack 130, the second adapter 150 is fixedly disposed on the rack 130, the first roller 110 is disposed on the first adapter 140, and the second roller 120 is disposed on the second adapter 150. Specifically, the first adapter 140 is a mounting base of the first roller 110, the first roller 110 is in a rotation fit with the first adapter 140, and the rotation fit between them is generally realized through a bearing, so that the first roller 110 can rotate smoothly without interference. The second adapter 150 is a mounting base of the second roller 120, the second roller 120 is in a rotation fit with the second adapter 150, and the rotation fit between them is generally realized through a bearing, so that the second roller 120 can smoothly rotate without interference. Because the first adapter 140 can move relative to the rack 130, that is, the first adapter 140 can move relative to the second adapter 150, the first roller 110 can move relative to the second roller 120, and therefore the relationship between the first roller 110 and the second roller 120 can be adjusted.

Moreover, the first adjustment assembly 210 is configured to be able to drive the first adapter 140 to move toward or away from the second adapter 150 so as to adjust the gap between the first roller 110 and the second roller 120; and the second adjustment assembly 220 is configured to apply a driving force to the first roller 110 via the first adapter 140, so as to adjust the rolling force between the first roller 110 and the second roller 120. Specifically, in this way, when the first adjustment assembly 210 drives the first adapter 140 to move toward the second adapter 150, the gap between the first roller 110 and the second roller 120 can be decreased; and when the first adjustment assembly 210 drives the first adapter 140 to move away from the second adapter 150, the gap between the first roller 110 and the second roller 120 can be increased. When the second adjustment assembly 220 applies a driving force for moving toward the second roller 120 to the first roller 110 via the first adapter 140, the rolling force between the first roller 110 and the second roller 120 can be increased; and when the second adjustment assembly 220 applies a driving force for moving away from the second roller 120 to the first roller 110 via the first adapter 140, the rolling force between the first roller 110 and the second roller 120 can be decreased.

Certainly, the adjustment of the gap and the rolling force between the first roller 110 and the second roller 120 needs to be specifically implemented based on the comparison result between the length monitored by the first monitoring mechanism 300 and the target length.

As shown in FIG. 1, the first adjustment assembly 210 includes a first driving module 211, a first inclined block 212, a second inclined block 213, and a range sensor 214.

The first inclined block 212 and the second inclined block 213 are disposed between the first adapter 140 and the second adapter 150, the first inclined block 212 is fixedly connected to the first adapter 140, and the first inclined block 212 and the second inclined block 213 each are provided with an inclined surface that is in a slidable fit on an opposite side; and the range sensor 214 is in communicative connection with the controller and configured to monitor a spacing between the first adapter 140 and the second adapter 150, and the first driving module 211 is connected to the second inclined block 213 and configured to drive the second inclined block 213 to move, so as to drive the first inclined block 212 to slide along the inclined surface.

Specifically, when the first driving module 211 drives the second inclined block 213 to move, the second inclined block 213 can move relative to the first inclined block 212, and the relative movement of the two is relative sliding along the inclined surface; and based on a guiding effect of the inclined surface, horizontal sliding of the second inclined block 213 can be converted into vertical sliding of the first inclined block 212. Certainly, the embodiments of this application do not limit the specific sliding directions of the first inclined block 212 and the second inclined block 213. The horizontal sliding of the second inclined block 213 and the vertical sliding of the first inclined block 212 are only examples in this implementation.

Because the first inclined block 212 is fixedly connected to the first adapter 140, when the first inclined block 212 is driven to slide by the second inclined block 213, the first adapter 140 moves relative to the second adapter 150, thereby implementing adjustment of the gap between the first roller 110 and the second roller 120. Generally, the second inclined block 213 is slidably disposed on the second adapter 150. However, the embodiments of this application do not limit the arranging position of the second inclined block 213. For example, the second inclined block 213 may alternatively be slidably disposed on the rack 130.

The range sensor 214 obtains the spacing between the first roller 110 and the second roller 120 by monitoring the distance between the first adapter 140 and the second adapter 150. The range sensor 214 can be in communicative interaction with the controller, and can feed back the spacing data of the first roller 110 and the second roller 120 to the controller, so as to enhance the closed-loop control function of the lithiation device.

In the embodiments of this application, the first driving module 211 may be in various types. For example, the first driving module 211 may be a hydraulic telescoping mechanism, a pneumatic telescoping mechanism, a linear motor, or the like. The first driving module 211 may directly drive the second inclined block 213 to slide.

In order to improve the stability and accuracy of driving the second inclined block 213 by the first driving module 211, the first driving module 211 and the second inclined block 213 may be connected by using a lead screw 215. The first driving module 211 drives the lead screw 215 to rotate, and the second inclined block 213 fits around the lead screw 215. In this case, the first driving module 211 is a conventional motor.

In addition to the above-mentioned types, the first adjustment assembly 210 in this embodiment of this application may be in other types. For example, the first adjustment assembly 210 only includes a driving structure, and the driving structure is directly connected to the first adapter 140 to drive the first roller 110 to move relative to the second roller 120.

As shown in FIG. 1, the second adjustment assembly 220 in this embodiment of this application may include a second driving module 221 and a pressure sensor 222, the second driving module 221 is mounted on the rack 130 and connected to the first adapter 140, and the pressure sensor 222 is in communicative connection with the controller and disposed between the second driving module 221 and the first adapter 140.

Specifically, based on Newton's third law of motion, every action has an equal and opposite reaction, and a rolling action on the electrode plate P between the first roller 110 and the second roller 120 will generate a reaction force that will be transmitted to the pressure sensor 222, so that the pressure sensor 222 can monitor the magnitude of the rolling force applied to the electrode plate P. Moreover, the pressure sensor 222 can be in communicative interaction with the controller and can feed back the rolling force generated by the first roller 110 and the second roller 120 to the electrode plate P to the controller, so as to enhance the closed-loop control function of the lithiation device.

In the embodiments of this application, the second driving module 221 may be in various types, for example, a hydraulic cylinder or an electric actuator. Certainly, the embodiments of this application do not limit the specific type of the second adjustment assembly 220. For example, the second adjustment assembly 220 may include only a driving structure for applying a driving force to the first adapter 140.

It should be noted that, due to the second adapter 150, the second roller 120 is fixedly disposed relative to the rack 130; and to ensure that the first roller 110 and the second roller 120 move closer to each other or farther away from each other, the first adapter 140 is generally arranged to slide on a preset track to restrain a movement track of the first roller 110.

In conclusion, it should be noted that the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A lithiation device for applying a lithium film (L) on an electrode plate (P), comprising:
    a rolling mechanism, comprising a first roller and a second roller, wherein the first roller and the second roller are configured to roll the electrode plate (P) and the lithium film (L) so as to apply the lithium film (L) on the electrode plate (P);
    an adjustment mechanism, connected to the rolling mechanism and configured to adjust a gap and/or a rolling force between the first roller and the second roller;
    a first monitoring mechanism, configured to monitor a length of the electrode plate (P) in a direction of traveling after the electrode plate (P) passes through the rolling mechanism and is rolled; and
    a controller, configured to control the adjustment mechanism based on a comparison result of the length monitored by the first monitoring mechanism and a target length so that the length of the electrode plate (P) after the electrode plate (P) passes through the rolling mechanism approximates to the target length;
    wherein the electrode plate (P) is provided with a plurality of spaced mark points (P1) along a traveling direction of the electrode plate (P), the first monitoring mechanism is configured to monitor a distance between two adjacent ones of the plurality of spaced mark points (P1) after the electrode plate (P) passes through the rolling mechanism, and the plurality of spaced mark points (P1) are through holes.

2. The lithiation device according to claim 1, wherein the rolling mechanism further comprises a servo motor configured to drive the first roller and/or the second roller; and
    the first monitoring mechanism comprises:
        a monitoring unit, wherein the monitoring unit is arranged at downstream of the rolling mechanism in a feeding direction of the electrode plate (P), and the monitoring unit is configured to send a signal when one of the plurality of spaced mark points (P1) is monitored;
        wherein the first monitoring mechanism is further configured to read a position difference monitored by an encoder of the servo motor during an interval of two signals to obtain a distance between two adjacent ones of the mark points (P1).

3. The lithiation device according to claim 2, wherein the monitoring unit is a through-beam photoelectric sensor, the through-beam photoelectric sensor comprises a transmitting terminal and a receiving terminal, the transmitting terminal and the receiving terminal are respectively located on two sides of the electrode plate (P) in a thickness direction, and light emitted from the transmitting terminal passes through the through holes and is received by the receiving terminal.

4. The lithiation device according to claim 1, wherein the lithiation device further comprises:
    a second monitoring mechanism, wherein the second monitoring mechanism is arranged at upstream of the rolling mechanism in the feeding direction of the electrode plate (P), and is configured to monitor a thickness of the electrode plate (P) before the electrode plate (P) passes through the rolling mechanism; and
    the controller is in communicative connection with the second monitoring mechanism, and the controller is configured to obtain the target length based on the thickness monitored by the second monitoring mechanism.

5. The lithiation device according to claim 4, wherein the second monitoring mechanism is configured to monitor a plurality of thicknesses of the electrode plate (P) before the electrode plate (P) passes through the rolling mechanism within a preset unit time, and the controller is configured to calculate an average thickness based on the plurality of thicknesses monitored by the second monitoring mechanism, and obtain the target length based on the average thickness.

6. The lithiation device according to claim 1, wherein the adjustment mechanism comprises a first adjustment assembly and a second adjustment assembly, the first adjustment assembly is configured to adjust the gap between the first roller and the second roller, the second adjustment assembly is configured to adjust the rolling force between the first roller and the second roller, and the controller is configured to control the first adjustment assembly and/or the second adjustment assembly based on the comparison result of the length monitored by the first monitoring mechanism and the target length.

7. The lithiation device according to claim 6, wherein the rolling mechanism further comprises a rack, a first adapter, and a second adapter, the first adapter is movably disposed on the rack, the second adapter is fixedly disposed on the rack, the first roller is disposed on the first adapter, and the second roller is disposed on the second adapter; and the first adjustment assembly is configured to be able to drive the first adapter to move toward or away from the second adapter, so as to adjust the gap between the first roller and the second roller; and the second adjustment assembly is configured to apply a driving force to the first roller via the first adapter, so as to adjust the rolling force between the first roller and the second roller.

8. The lithiation device according to claim 7, wherein the first adjustment assembly comprises a first driving module, a first inclined block, a second inclined block, and a range sensor;

the first inclined block and the second inclined block are disposed between the first adapter and the second adapter, the first inclined block is fixedly connected to the first adapter, and the first inclined block and the second inclined block each are provided with an inclined surface that is in a slidable fit on an opposite side; and the range sensor is in communicative connection with the controller and configured to monitor a spacing between the first adapter and the second adapter, and the first driving module is connected to the second inclined block and configured to drive the second inclined block to move, so as to drive the first inclined block to slide along the inclined surface.

9. The lithiation device according to claim 7, wherein the second adjustment assembly comprises a second driving module and a pressure sensor, the second driving module is mounted on the rack and connected to the first adapter, and the pressure sensor is in communicative connection with the controller and disposed between the second driving module and the first adapter.

10. A lithiation device for applying a lithium film (L) on an electrode plate (P), comprising:

a rolling mechanism, comprising a first roller and a second roller, wherein the first roller and the second roller are configured to roll the electrode plate (P) and the lithium film (L) so as to apply the lithium film (L) on the electrode plate (P);

an adjustment mechanism, connected to the rolling mechanism and configured to adjust a gap and/or a rolling force between the first roller and the second roller;

a first monitoring mechanism, configured to monitor a length of the electrode plate (P) in a direction of traveling after the electrode plate (P) passes through the rolling mechanism and is rolled; and a controller, configured to control the adjustment mechanism based on a comparison result of the length monitored by the first monitoring mechanism and a target length so that the length of the electrode plate (P) after the electrode plate (P) passes through the rolling mechanism approximates to the target length;

wherein:

the electrode plate (P) is provided with a plurality of spaced mark points (P1) along a traveling direction of the electrode plate (P), and the first monitoring mechanism is configured to monitor a distance between two adjacent ones of the plurality of spaced mark points (P1) after the electrode plate (P) passes through the rolling mechanism;

the rolling mechanism further comprises a servo motor configured to drive the first roller and/or the second roller;

the first monitoring mechanism comprises a monitoring unit arranged at downstream of the rolling mechanism in a feeding direction of the electrode plate (P), and configured to send a signal when one of the plurality of spaced mark points (P1) is monitored; and the first monitoring mechanism is further configured to read a position difference monitored by an encoder of the servo motor during an interval of two signals to obtain a distance between two adjacent ones of the plurality of spaced mark points (P1).

* * * * *